(12) United States Patent
Chen et al.

(10) Patent No.: US 9,371,073 B1
(45) Date of Patent: Jun. 21, 2016

(54) REAL-TIME DETERMINATION OF TIRE NORMAL FORCES

(71) Applicant: GM GLOBAL TECHNOLOGY OPERATIONS LLC, Detroit, MI (US)

(72) Inventors: Shih-Ken Chen, Troy, MI (US); Valery Pylypchuk, West Bloomfield, MI (US); Nikolai K. Moshchuk, Grosse Pointe, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/744,144

(22) Filed: Jun. 19, 2015

(51) Int. Cl.
*B60W 40/12* (2012.01)

(52) U.S. Cl.
CPC .......... *B60W 40/12* (2013.01); *B60W 2420/22* (2013.01); *B60W 2510/22* (2013.01); *B60W 2520/14* (2013.01); *B60W 2520/16* (2013.01); *B60W 2520/18* (2013.01); *B60W 2530/20* (2013.01)

(58) Field of Classification Search
CPC .......................... B60W 40/12; B60W 2420/22
See application file for complete search history.

(56) References Cited

U.S. PATENT DOCUMENTS

| | | | |
|---|---|---|---|
| 7,028,540 B2 | 4/2006 | Morikawa | |
| 7,845,218 B2 | 12/2010 | Joe et al. | |
| 8,825,267 B2* | 9/2014 | Gerdin | B60C 23/061 340/438 |
| 2005/0209762 A1* | 9/2005 | Lu | B60T 7/22 701/70 |
| 2005/0236896 A1* | 10/2005 | Offerle | B60T 8/1755 303/146 |
| 2005/0240326 A1* | 10/2005 | Lauwerys | B60G 17/018 701/38 |
| 2006/0253243 A1 | 11/2006 | Svendenius et al. | |
| 2007/0067085 A1* | 3/2007 | Lu | B60T 8/172 701/70 |
| 2007/0074565 A1* | 4/2007 | Jayakumar | G06F 17/5018 73/146 |
| 2008/0281487 A1* | 11/2008 | Milot | B60G 17/0162 701/38 |
| 2009/0118905 A1* | 5/2009 | Takenaka | B60T 8/17552 701/41 |
| 2009/0171526 A1* | 7/2009 | Takenaka | B60T 8/17552 701/70 |
| 2009/0177346 A1 | 7/2009 | Hac | |
| 2009/0319114 A1* | 12/2009 | Takenaka | B60T 8/1755 701/48 |
| 2012/0179327 A1 | 7/2012 | Yngve et al. | |
| 2014/0195112 A1* | 7/2014 | Lu | B60G 17/015 701/37 |
| 2014/0379215 A1* | 12/2014 | Kikuchi | B60G 17/018 701/37 |

FOREIGN PATENT DOCUMENTS

| | | |
|---|---|---|
| EP | 1516794 A1 | 3/2005 |
| WO | WO03008243 A1 | 1/2003 |

\* cited by examiner

*Primary Examiner* — Thomas Tarcza
*Assistant Examiner* — Alex C Dunn
(74) *Attorney, Agent, or Firm* — Quinn Law Group, PLLC

(57) ABSTRACT

A device includes a plurality of tires and a suspension system as subcomponents. The suspension system includes at least one suspension sensor configured to provide suspension data (S). A controller is operatively connected to the suspension sensor. The controller has a processor and tangible, non-transitory memory on which is recorded instructions for executing a method for determining respective tire normal forces ($F_{zi}(t)$, i=1 ... 4) for one or more of the plurality of tires, based at least partially on the suspension data (S). The tire normal force ($F_z$) is the net force acting on each tire (or wheel) in the vertical direction. The tire normal force acting on each tire may be determined without using the specific model of the tire, road information, wheel or tire sensors.

17 Claims, 2 Drawing Sheets

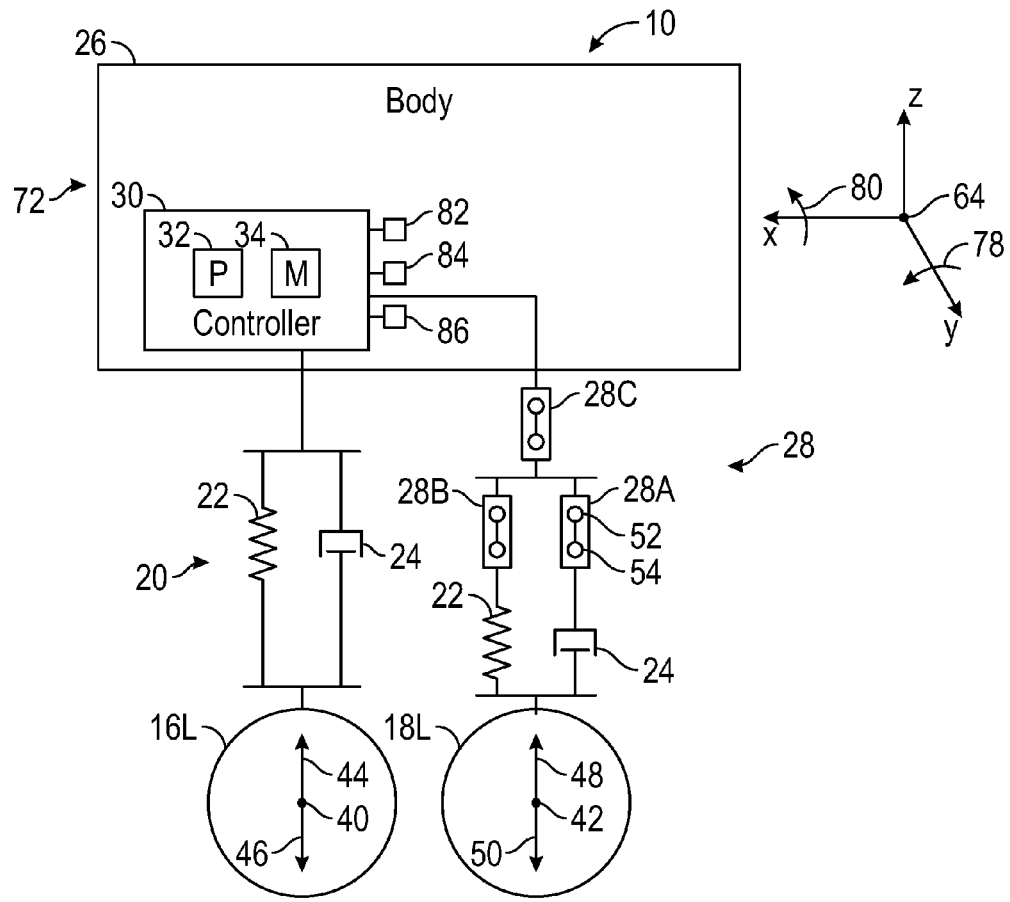
FIG. 2
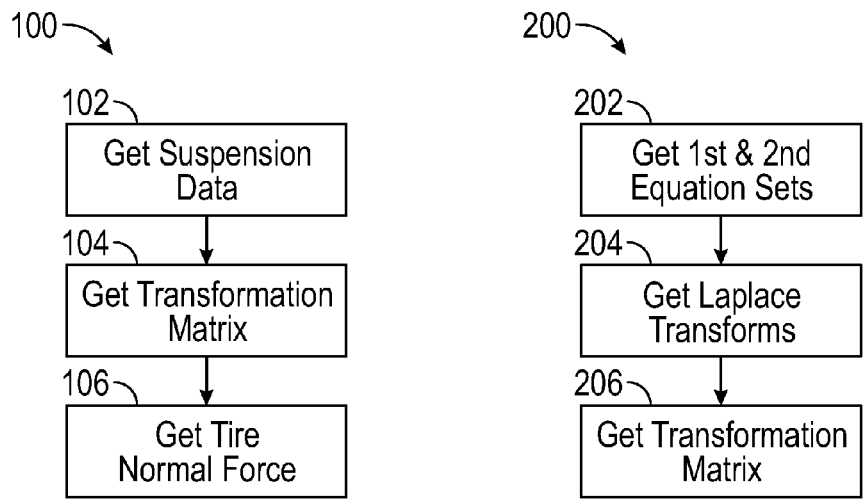
FIG. 3
FIG. 4

REAL-TIME DETERMINATION OF TIRE NORMAL FORCES

TECHNICAL FIELD

The disclosure relates generally to determination of tire normal forces in a device, without the use of any tire or wheel sensors.

BACKGROUND

Tire normal forces play significant roles in the dynamics of a device having tires. The tire normal forces may be determined with the use of tire sensors.

SUMMARY

A device includes a plurality of tires and a suspension system. The device may be a vehicle, a robot, a farm implement, sports-related equipment or any other type of apparatus. The suspension system includes at least one suspension sensor configured to provide suspension data (S). A controller is operatively connected to the suspension sensor. The controller has a processor and tangible, non-transitory memory on which is recorded instructions for executing a method for determining respective real-time tire normal forces (e.g. $F_{zi}$(t), i=1 . . . 4) for one or more of the plurality of tires, based at least partially on the suspension data (S). The tire normal force is the net force acting on each tire (or wheel, used interchangeably) in the vertical direction. The tire normal force acting on each tire is determined without requiring tire sensors, the specific model of the tire or road information. At least one suspension sensor may include a strain gage or a thin-film strain gage.

Execution of the instructions by the processor causes the controller to determine a transformation matrix (T) based on a plurality of predefined parameters. The controller is configured to obtain the respective real-time tire normal forces (e.g. $F_{zi}$(t), i=1 . . . 4) by multiplying the suspension data (S) with the transformation matrix (T). The suspension data (S) may include respective real-time suspension forces ($S_i$(t), i=1 . . . 4) for each of the plurality of tires. The respective tire normal forces are operative to adjust the operation or control of the device, i.e., the operation of the device may be adjusted based on the magnitude or value of the respective tire normal forces.

The predefined parameters include: a first distance (a) from a front axle of the device to a center of gravity of the device; a second distance (b) from a rear axle of the device to the center of gravity of the device; and a track width (d) between respective first and second centerlines of two laterally-spaced tires. The plurality of tires includes two laterally-spaced tires, such that the two laterally-spaced tires are both on one of the front axle and the rear axle. The predefined parameters further include: a roll moment of inertia ($I_{xx}$); a pitch moment of inertia ($I_{yy}$); a sprung mass (M) of the device; and respective masses ($m_i$) of each of the plurality of tires.

The transformation matrix (T) may include a first row having first, second, third and fourth coefficients ($T_{11}$, $T_{12}$, $T_{13}$, $T_{14}$) based at least partially on a first mass ($m_1$) of the first tire, the first distance (a), the second distance (b), the track width (d), the roll moment of inertia ($I_{xx}$), the pitch moment of inertia ($I_{yy}$) and the sprung mass (M).

The transformation matrix (T) may include a second row having fifth, sixth, seventh and eighth coefficients ($T_{21}$, $T_{22}$, $T_{23}$, $T_{24}$) based at least partially on a second mass ($m_2$) of the second tire, the first distance (a), the second distance (b), the track width (d), the roll moment of inertia ($I_{xx}$), the pitch moment of inertia ($I_{yy}$) and the sprung mass (M).

The transformation matrix (T) may include a third row having ninth, tenth, eleventh and twelfth coefficients ($T_{31}$, $T_{32}$, $T_{33}$, $T_{34}$) based at least partially on a third mass ($m_3$) of a third tire, the first distance (a), the second distance (b), the track width (d), the roll moment of inertia ($I_{xx}$), the pitch moment of inertia ($I_{yy}$) and the sprung mass (M).

The transformation matrix (T) may include a fourth row having thirteenth, fourteenth, fifteenth and sixteenth coefficients ($T_{41}$, $T_{42}$, $T_{43}$, $T_{44}$) based at least partially on a fourth mass ($m_4$) of a fourth tire, the first distance (a), the second distance (b), the track width (d), the roll moment of inertia ($I_{xx}$), the pitch moment of inertia ($I_{yy}$) and the sprung mass (M).

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a schematic fragmentary side view of the device of FIG. 1;

FIG. 3 is a flowchart for a method for determining a tire normal force ($F_z$) for the plurality of tires of FIG. 1; and FIG. 4 is a flowchart for a method for determining a transformation matrix (T) that may be used in the method of FIG. 3.

DETAILED DESCRIPTION

Figure 1:
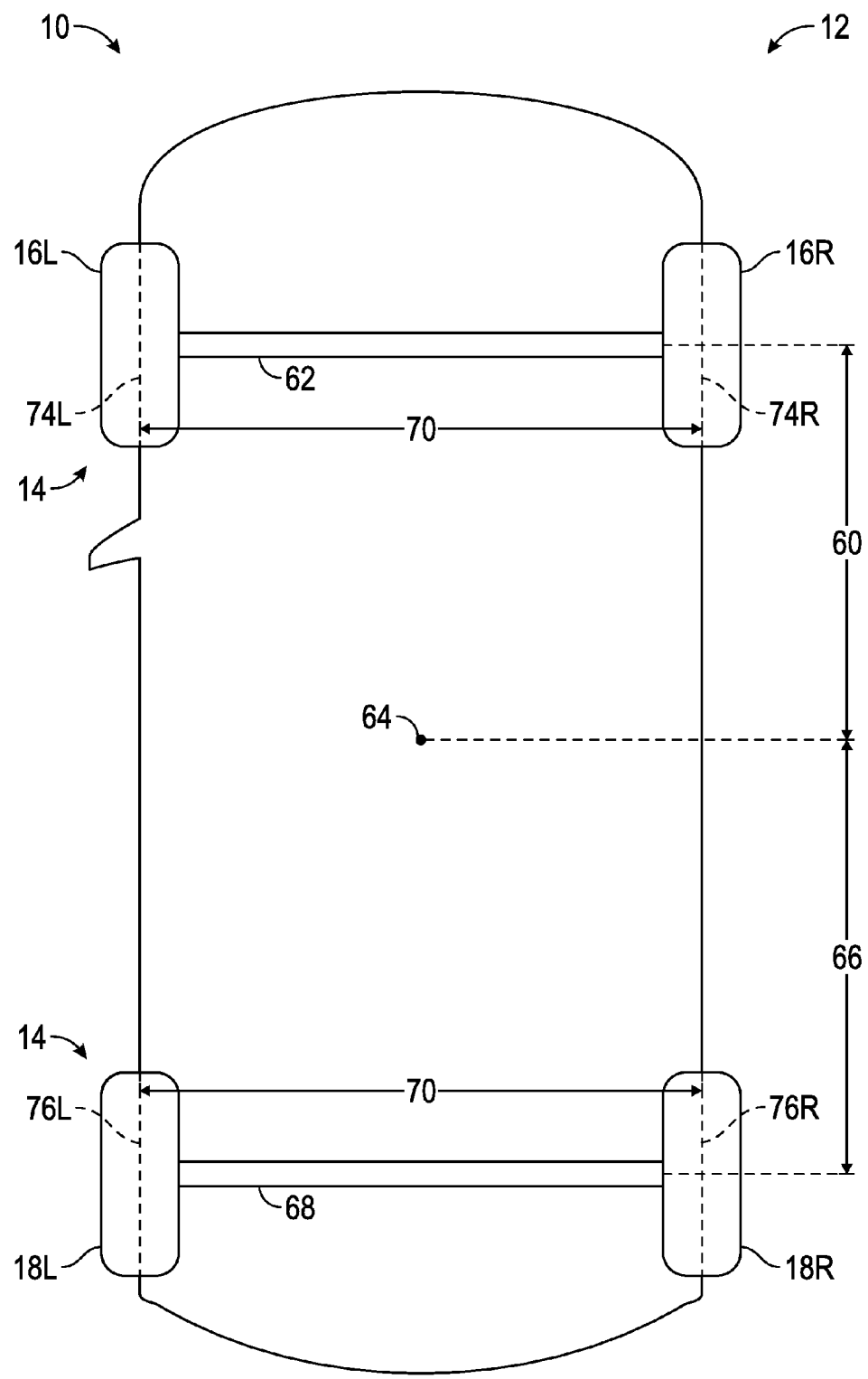
FIG. 1 is a schematic fragmentary plan view of a device having a plurality of tires.

Referring to the Figures, wherein like reference numbers refer to the same or similar components throughout the several views, FIG. 1 is a schematic fragmentary plan view of a device 10 having a plurality of tires 14. The device 10 may be a vehicle 12. However, it is to be understood that the device 10 may be a robot, a farm implement, sports-related equipment or any other type of apparatus. In the embodiment shown, the plurality of tires 14 include first, second, third and fourth tires 16L, 16R, 18L, 18R, respectively. However, it is to be understood that the device 10 may include any number of tires.

FIG. 2 is a schematic fragmentary side view of the device 10, showing the first and third tires 16L, 18L. Referring to FIG. 2, the device 10 includes a suspension system 20 operatively connected to the plurality of tires 14. The suspension system 20 may include springs 22, shock absorbers or dampers 24 and various other components (not shown) operatively connected to a body 26. The suspension system 20 includes at least one suspension sensor 28 (see sensors 28A, B, C in FIG. 2). Referring to FIG. 2, a controller 30 is operatively connected to the suspension sensor 28 and various other components of the device 10.

Referring to FIG. 2, the controller 30 has a processor 32 and tangible, non-transitory memory 34 on which is recorded instructions for executing a method 100, described below with reference to FIGS. 1-3, for determining respective real-time tire normal forces ($F_{zi}$(t), i=1 . . . 4) for one or more of the plurality of tires 14, based at least partially on the suspension data (S) obtained by the suspension sensor 28. The suspension data (S) includes respective real-time suspension forces ($S_i$(t), i=1 . . . 4) for each of the plurality of tires 14, on a device 10 with 4 tires.

The tire normal force is the net force acting on each tire (or wheel, used interchangeably) in the vertical direction z. Referring to FIG. 2, the respective centers of gravity 40, 42 for the first and third tires 16L, 18L are shown. Each of the plurality of tires 14 has a tire normal force ($F_z$) and a suspension force ($S_i$) acting on it. Referring to FIG. 2, the first tire 16L is acted upon by a tire normal force ($F_1$), shown by arrow 44, and a suspension force ($S_1$), shown by arrow 46. Referring to FIG. 2, the third tire 18L is acted upon by a tire normal force ($F_3$), shown by arrow 48, and a suspension force ($S_3$), shown by arrow 50.

The method 100 of FIG. 3 may be employed in any device 10 that requires tire normal force ($F_z$) estimation. Using method 100, the tire normal force may be determined without requiring tire model information, road information, wheel or tire sensors. Thus, execution of the instructions by the processor 32 improves the functioning of the device 10 by allowing the determination of tire normal forces in realtime using suspension sensors 28, without requiring the use of tire or wheel sensors.

Referring to FIG. 2, the suspension sensor 28 may be installed in various positions, as shown by sensors 28A, 28B and 28C. Variations in installation of the suspension sensor 28 may depend upon the design of the device 10 and affect only transition from measured signals to suspension forces, see eqn. (1). However, mathematical structure of the transformation matrix (T) remains the same. Referring to FIG. 2, the suspension sensor 28 may include strain gage 52 (such as a a thin-film strain gage) operatively connected to the controller 30. The strain gage 52 is configured to vary its electrical resistance with the variation of strain elements at the surface of installation. Strain variations are caused by suspension forces that may be identified through strains by using linear elasticity laws in the controller block 30. This resistance change of the strain gage 52 may be measured using a Wheatstone bridge 54, as understood by those skilled in the art. The strain may be defined as the relative displacement of the entire suspension part 20 or any local segment of spring, shock absorber, or any component of the suspension mount. The controller 30 accounts for the type of strain definition and type sensor installation through its 'strain to force' conversion relationship; see equation (1) below. The strain gage 52 may detect a combined force created by both spring and shock absorber together (as shown by sensor 28C). It is to be understood that the device 10 may employ any type of suspension sensor 28 known to those skilled in the art.

The controller 30 may be an integral portion of, or a separate module operatively connected to, other control modules of the device 10. The device 10 may take many different forms and include multiple and/or alternate components and facilities. While an example device 10 is shown in the Figures, the components illustrated in the Figures are not intended to be limiting. Indeed, additional or alternative components and/or implementations may be used.

Referring now to FIG. 3, a flowchart of the method 100 stored on and executable by the controller 30 of FIG. 1 is shown. Method 100 need not be applied in the specific order recited herein. Furthermore, it is to be understood that some blocks may be added or eliminated. Referring to FIG. 3, method 100 may begin with block 102 where the controller 30 is programmed to obtain suspension data (S) via the at least one suspension sensor 28. The suspension data (S) may include respective real-time suspension forces ($S_i(t)$, i=1 . . . 4) for each of the plurality of tires 14. The suspension sensor 28 and suspension data (S) may be calibrated in a test lab with a set of calibration factors, shown below as [$\alpha, \beta, \gamma, \delta$]. In equation (1) below, $S_i$ represents the suspension force and $\epsilon_i$ represents the readings from the suspension sensor 28. Dependence for equation (1) may be linear or nonlinear based on the type of suspension sensors 28.

$$\begin{bmatrix} S_1 \\ S_2 \\ S_3 \\ S_4 \end{bmatrix} = \begin{bmatrix} \alpha(\epsilon_1) \\ \beta(\epsilon_2) \\ \gamma(\epsilon_3) \\ \delta(\epsilon_4) \end{bmatrix} \quad (1)$$

In block 104 of FIG. 3, the controller 30 is programmed or configured to determine a transformation matrix (T) based on a plurality of predefined parameters for the device 10. Referring to FIG. 1, the predefined parameters include: a first distance 60 (a) from a front axle 62 of the device 10 to a center of gravity 64 of the device 10; a second distance 66 (b) from a rear axle 68 of the device 10 to the center of gravity 64 of the device 10; and a track width 70 (d). Referring to FIG. 1, the track width 70 (d), or side-side lateral width of the device 10, may be defined as the distance between first and second centerlines 74L, 74R (or 76L, 76R) of two laterally-spaced tires 16L, 16R (or 18L, 18R) of the plurality of tires 14, such that the two laterally-spaced tires are on either the front axle 62 (first and second tires 16L, 16R) or the rear axle 68 (third and fourth tires 18L, 18R).

The predefined parameters further include: a roll moment of inertia ($I_{xx}$); a pitch moment of inertia ($I_{yy}$); a sprung mass 72 (M) of the device 10 (see FIG. 2); and respective masses ($m_i$) of each of the plurality of tires 14. The moment of inertia, otherwise known as the angular mass or rotational inertia, of a rigid body determines the torque needed for a desired angular acceleration about a rotational axis, such as the y-axis for pitch movement 78 ($\theta$) (front to rear motion of the device 10 shown in FIG. 2) or the x-axis for roll movement 80 ($\phi$) (side to side motion of the device 10 shown in FIG. 2). The moment of inertia depends on a body's mass distribution and the axis chosen, with larger moments requiring more torque to change the body's rotation.

The predefined parameters may vary in real-time or may be constant for each device 10. For example, the first distance 60 (a), second distance 66 (b) and track width 70 (d) may be predetermined constants for the device 10. The roll moment of inertia ($I_{xx}$) and pitch moment of inertia ($I_{yy}$) may be predefined with respective initial values for a given device 10 and calibrated in real time afterwards. The sprung mass 72 (M) and respective masses ($m_i$) of the tires may be predefined through a nominal, initial value and may then be calibrated in real time afterwards. One or more mass sensors 86 may be employed to calibrate or scale the initial values of the sprung mass 72 (M) and respective masses ($m_i$) of each of the plurality of tires 14.

Referring to FIG. 2, in a device 10 with a suspension system 20, the sprung mass 72 (M) is the portion of the total mass of the device 10 that is supported above the suspension system 20. The sprung mass 72 (M) typically includes the body 26 and the internal components (not shown) of the device 10 such as passengers, cargo, etc. The sprung mass 72 (M) does not include the mass of the components suspended below the suspension system 20. In contrast, the unsprung mass is the mass of the suspension system 20, wheel axles/bearings/hubs, tires and other components directly connected to the suspension system 20, rather than supported by the suspension system 20. The device 10 may include a roll sensor 82 and a pitch sensor 84.

As noted above, in block 104 of FIG. 3, the controller 30 is programmed or configured to determine a transformation matrix (T) based on a plurality of predefined parameters. In a device 10 with n tires, the transformation matrix (T) may include n rows and n columns. In the embodiment shown, the device 10 includes four tires 16L, 16R, 18L, 18R; thus the transformation matrix (T) is a four-by-four matrix as shown below in equation (2):

$$\begin{bmatrix} T11 & T12 & T13 & T14 \\ T21 & T22 & T23 & T24 \\ T31 & T32 & T33 & T34 \\ T41 & T42 & T43 & T44 \end{bmatrix} \quad (2)$$

The transformation matrix (T) includes a first row having first, second, third and fourth coefficients ($T_{11}$, $T_{12}$, $T_{13}$, $T_{14}$) that are based at least partially on a first mass ($m_1$) of a first tire (such as 16L in FIG. 1), the first distance 60 (a), the second distance 66 (b), the track width 70 (d), the roll moment of inertia ($I_{xx}$), the pitch moment of inertia ($I_{yy}$) and the sprung mass (M). It is to be understood that the order of the tires may be changed, thus any one of the plurality of tires 14 may be termed the "first tire." Referring to the set of equations (3) below, the first, second, third and fourth coefficients ($T_{11}$, $T_{12}$, $T_{13}$, $T_{14}$) may be defined as:

$T_{11}=1+m_1*(d^2/I_{xx}+a^2/I_{yy}+1/M);$ $T_{12}=m_1*[-(d^2/I_{xx})+a^2/I_{yy}+1/M];$ $T_{13}=m_1*[-(a*b/I_{yy})+1/M+(d^2/I_{xx})];$ $T_{14}=m_1*[-(a*b/I_{yy})+1/M-(d^2/I_{xx})].$ (3)

The transformation matrix (T) includes a second row having fifth, sixth, seventh and eighth coefficients ($T_{21}$, $T_{22}$, $T_{23}$, $T_{24}$) that are based at least partially on a second mass ($m_2$) of a second tire (such as 16R in FIG. 1), the first distance 60 (a), the second distance 66 (b), the track width 70(d), the roll moment of inertia ($I_{xx}$), the pitch moment of inertia ($I_{yy}$) and the sprung mass (M). Referring to the set of equations (4) below, the fifth, sixth, seventh and eighth coefficients ($T_{21}$, $T_{22}$, $T_{23}$, $T_{24}$) may be defined as:

$T_{21}=m_2*[-(d^2/I_{xx})+a^2/I_{yy}+1/M];$ $T_{22}=1+m_2*(d^2/I_{xx}+a^2/I_{yy}+1/M);$ $T_{23}=m_2*[-(a*b/I_{yy})+1/M-(d^2/I_{xx})];$ $T_{24}=m_2*[-(a*b/I_{yy})+1/M+(d^2/I_{xx})].$ (4)

The transformation matrix (T) includes a third row having ninth, tenth, eleventh and twelfth coefficients ($T_{31}$, $T_{32}$, $T_{33}$, $T_{34}$) that are based at least partially on a third mass ($m_3$) of a third tire (such as 18L in FIG. 1), the first distance 60 (a), the second distance 66 (b), the track width 70 (d), the roll moment of inertia ($I_{xx}$), the pitch moment of inertia ($I_{yy}$) and the sprung mass (M). Referring to the set of equations (5) below, the ninth, tenth, eleventh and twelfth coefficients ($T_{31}$, $T_{32}$, $T_{33}$, $T_{34}$) may be defined as:

$T_{31}=m_3*[-(a*b/I_{yy})+1/M+d^2/I_{xx}];$ $T_{32}=m_3*[-(a*b/I_{yy})+1/M-d^2/I_{xx}];$ $T_{33}=1+m_3*(b^2/I_{yy}+1/M+d^2/I_{xx});$ $T_{34}=m_3*(b^2/I_{yy}+1/M-d^2/I_{xx}).$ (5)

The transformation matrix (T) includes a fourth row having thirteenth, fourteenth, fifteenth and sixteenth coefficients ($T_{41}$, $T_{42}$, $T_{43}$, $T_{44}$) that are based at least partially on a fourth mass ($m_4$) of a fourth tire (such as 18R in FIG. 1), the first distance 60 (a), the second distance 66 (b), the track width 70 (d), the roll moment of inertia ($I_{xx}$), the pitch moment of inertia ($I_{yy}$) and the sprung mass (M). Referring to the set of equations (6) below, the thirteenth, fourteenth, fifteenth and sixteenth coefficients ($T_{41}$, $T_{42}$, $T_{43}$, $T_{44}$) may be defined as:

$T_{41}=m_4[-(a*b/I_{yy})+1/M-d^2/I_{xx}];$ $T_{42}=m_4*[-(a*b/I_{yy})+1/M+d^2/I_{xx}];$ $T_{43}=m_4*(b^2/I_{yy}+1/M-d^2/I_{xx});$ and $T_{44}=1+m_4*(b^2/I_{yy}+1/M+d^2/I_{xx}).$ (6)

In block 106 of FIG. 3, the controller 30 is programmed or configured to obtain the tire normal force ($F_z$) for each of the plurality of tires 14 by multiplying the suspension data (S) with the transformation matrix (T), as indicated below in equation (7).

$$\begin{bmatrix} F_{z1} \\ F_{z2} \\ F_{z3} \\ F_{zn} \end{bmatrix} = T \begin{bmatrix} S_1 \\ S_2 \\ S_3 \\ S_n \end{bmatrix} \quad (7)$$

Execution of the instructions by the processor improves the functioning of the device 10 by allowing the determination of tire normal forces, without requiring installation of tire sensors or road information. Tire normal forces may play significant roles in the dynamics of the device 10 and may be employed as inputs for various control algorithms, further improving the functioning of the device 10.

Referring to FIGS. 1 and 4, the processor 32 and tangible, non-transitory memory 34 of the controller 30 may include recorded instructions for executing an example method 200 for obtaining the transformation matrix (T). Method 200 is one example and other methods may be employed for obtaining the transformation matrix (T). Method 200 includes blocks 202, 204 and 206, shown in FIG. 4.

In block 202, the controller 30 is programmed or configured to obtain a first set of equations (8) describing the vertical wheel dynamics of the device 10 and a second set of equations (9) describing the suspension forces ($S_i=S_i(t)$, i=1, . . . , 4), referred to herein as sprung- and unsprung mass dynamic equations, respectively. Here, $k_{sf}$, $c_{sf}$, and $k_{sr}$, and $c_{sr}$ are front and rear stiffness and viscosity coefficients of the suspension system 20 of the device 10, respectively; Zc describes the vertical motion of the sprung mass (M); and ($z_i$, i=1, . . . , 4) are the vertical displacements of wheel/tire centers 14, the over dot indicates time derivative, and the other parameters are the same as previously described.

$M\ddot{Z}_c = S_1+S_2+S_3+S_4$ $I_{yy}\ddot{\theta} = -aS_1-aS_2+bS_3+bS_4$ $I_{xx}\ddot{\varphi} = d/2(S_1-S_2+S_3-S_4)$ (8)

$S_1(t)=-c_{sf}(\dot{Z}_c-a\dot{\theta}+(d/2)\dot{\varphi}-\dot{z}_1)-k_{sf}(Z_c-a\theta+(d/2)\varphi-z_1)$ $S_2(t)=-c_{sf}(\dot{Z}_c-a\dot{\theta}-(d/2)\dot{\varphi}-\dot{z}_2)-k_{sf}(Z_c-a\theta-(d/2)\varphi-z_2)$ $$S_3(t) = -c_{sr}(\dot{\tilde{Z}}_c + b\dot{\theta} + (d/2)\dot{\varphi} - \dot{z}_3) - k_{sr}(Z_c + b\theta + (d/2)\varphi - z_3)$$

$$S_4(t) = -c_{sr}(\dot{\tilde{Z}}_c + b\dot{\theta} - (d/2)\dot{\varphi} - \dot{z}_4) - k_{sr}(Z_c + b\theta - (d/2)\varphi - z_4) \quad (9)$$

In block 204, the controller 30 is programmed or configured to obtain the Laplace transforms (converting from 'z' space to 'p' space) of the first and second set of equations, shown below as equations (10) and (11), respectively. Here, each tilde variable indicates the corresponding Laplace image as a function of p.

$$\tilde{Z}_c = \frac{1}{Mp^2}(\tilde{S}_1 + \tilde{S}_2 + \tilde{S}_3 + \tilde{S}_4) \quad (10)$$

$$\tilde{\theta} = \frac{1}{I_{yy}p^2}(-a\tilde{S}_1 - a\tilde{S}_2 + b\tilde{S}_3 + b\tilde{S}_4)$$

$$\tilde{\varphi} = \frac{d}{2I_{xx}p^2}(\tilde{S}_1 - \tilde{S}_2 + \tilde{S}_3 - \tilde{S}_4)$$

$$\tilde{z}_1 = \tilde{Z}_c - a\tilde{\theta} + \frac{d}{2}\tilde{\varphi} + \frac{\tilde{S}_1}{c_{sf}p + k_{sf}} \quad (11)$$

$$\tilde{z}_2 = \tilde{Z}_c - a\tilde{\theta} - \frac{d}{2}\tilde{\varphi} + \frac{\tilde{S}_2}{c_{sf}p + k_{sf}}$$

$$\tilde{z}_3 = \tilde{Z}_c + b\tilde{\theta} + \frac{d}{2}\tilde{\varphi} + \frac{\tilde{S}_3}{c_{sr}p + k_{sr}}$$

$$\tilde{z}_4 = \tilde{Z}_c + b\tilde{\theta} - \frac{d}{2}\tilde{\varphi} + \frac{\tilde{S}_4}{c_{sr}p + k_{sr}}$$

In block 206 of FIG. 4, the transformation matrix (T) may be obtained by using the equations (7), (10) and (11) above, and equation (12) below. The transformation matrix (T) may be calibrated using known values of suspension forces ($S_i = S_i(t)$, i=1, ..., 4) and tire normal forces ($F_{zi}(t)$, i=1 ... 4) for the device 10.

$$m\ddot{\tilde{z}}_i = -S_i + F_{zi} \quad (12)$$

(i=1, ..., 4)

As noted above, the controller 30 of FIG. 1 may include a computing device that employs an operating system or processor 32 and memory 34 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 52 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A device comprising:

a plurality of tires;

a suspension system operatively connected to the plurality of tires;

at least one suspension sensor operatively connected to the suspension system and configured to provide suspension data (S);

a controller operatively connected to the at least one suspension sensor and having a processor and tangible, non-transitory memory on which is recorded instructions for executing a method for determining respective tire normal forces ($F_{zi}(t)$, i=1 ... n) for one or more of the plurality of tires, based at least partially on the suspension data (S), the respective tire normal forces being operative to adjust operation of the wheeled device;

wherein execution of the instructions by the processor causes the controller to determine a transformation matrix (T) based on a plurality of predefined parameters;

wherein the suspension data (S) includes respective real-time suspension forces ($S_i(t)$, i=1 ... n) for each of the plurality of tires;

wherein the controller is configured to obtain the respective tire normal forces ($F_{zi}(t)$, i=1 ... n) by multiplying the suspension data (S) with the transformation matrix (T) such that:

$$\begin{bmatrix} F_{z1} \\ F_{z2} \\ F_{z3} \\ F_{zn} \end{bmatrix} = T \begin{bmatrix} S_1 \\ S_2 \\ S_3 \\ S_n \end{bmatrix};$$

wherein the plurality of tires includes two laterally-spaced tires, such that the two laterally-spaced tires are both on one of a front axle and a rear axle;
wherein the plurality of predefined parameters includes:
  a first distance (a) from the front axle of the device to a center of gravity of the device;
  a second distance (b) from the rear axle of the device to the center of gravity of the device;
  a track width (d) between respective first and second centerlines of the two laterally-spaced tires;
  a roll moment of inertia ($I_{xx}$) of the device;
  a pitch moment of inertia ($I_{yy}$) of the device;
  a sprung mass (M) of the device; and
  respective masses ($m_i$) of each of the plurality of tires;
wherein the first tire has a first mass ($m_1$) and the transformation matrix (T) includes a first row having first, second, third and fourth coefficients ($T_{11}$, $T_{12}$, $T_{13}$, $T_{14}$) based at least partially on the first mass ($m_1$), the first distance (a), the second distance (b), the track width (d), the roll moment of inertia ($I_{xx}$), the pitch moment of inertia ($I_{yy}$) and the sprung mass (M).

2. The device of claim 1, wherein the at least one suspension sensor includes a strain gage.

3. The device of claim 1, wherein the first, second, third and fourth coefficients ($T_{11}$, $T_{12}$, $T_{13}$, $T_{14}$) are defined as:

$T_{11}=1+m_1*(d^2/I_{xx}+a^2/I_{yy}+1/M);$ $T_{12}=m_1*[-(d^2/I_{xx})+a^2/I_{yy}+1/M];$ $T_{13}=m_1*[-(a*b/I_{yy})+1/M+(d^2/I_{xx})];$ and $T_{14}=m_1*[-(a*b/I_{yy})+1/M-(d^2/I_{xx})].$ 4. The device of claim 1, wherein:
the second tire has a second mass ($m_2$); and
the transformation matrix (T) includes a second row having fifth, sixth, seventh and eighth coefficients ($T_{21}$, $T_{22}$, $T_{23}$, $T_{24}$) based at least partially on the second mass ($m_2$), the first distance (a), the second distance (b), the track width (d), the roll moment of inertia ($I_{xx}$), the pitch moment of inertia ($I_{yy}$) and the sprung mass (M).

5. The device of claim 4, wherein the fifth, sixth, seventh and eighth coefficients ($T_{21}$, $T_{22}$, $T_{23}$, $T_{24}$) are defined as:

$T_{21}=m_2*[-(d^2/I_{xx})+a^2/I_{yy}+1/M];$ $T_{22}=1+m_2*(d^2/I_{xx}+a^2/I_{yy}+1/M);$ $T_{23}=m_2*[-(a*b/I_{yy})+1/M-(d^2/I_{xx})];$ and $T_{24}=m_2*[-(a*b/I_{yy})+1/M+(d^2/I_{xx})].$ 6. The device of claim 1, wherein:
the plurality of tires includes a third tire having a third mass ($m_3$);
the transformation matrix (T) includes a third row having ninth, tenth, eleventh and twelfth coefficients ($T_{31}$, $T_{32}$, $T_{33}$, $T_{34}$) based at least partially on the third mass ($m_3$), the first distance (a), the second distance (b), the track width (d), the roll moment of inertia ($I_{xx}$), the pitch moment of inertia ($I_{yy}$) and the sprung mass (M).

7. The device of claim 6, wherein the ninth, tenth, eleventh and twelfth coefficients ($T_{31}$, $T_{32}$, $T_{33}$, $T_{34}$) are defined as:

$T_{31}=m_3*[-(a*b/I_{yy})+1/M+d^2/I_{xx}];$ $T_{32}=m_3*[-(a*b/I_{yy})+1/M-d^2/I_{xx}];$ $T_{33}=1+m_3*(b^2/I_{yy}+1/M+d^2/I_{xx});$ and $T_{34}=m_3*(b^2/I_{yy}+1/M-d^2/I_{xx}).$ 8. The device of claim 1, wherein:
the plurality of tires includes a fourth tire having a fourth mass ($m_4$); and
the transformation matrix (T) includes a fourth row having thirteenth, fourteenth, fifteenth and sixteenth coefficients ($T_{41}$, $T_{42}$, $T_{43}$, $T_{44}$) based at least partially on the fourth mass ($m_4$), the first distance (a), the second distance (b), the track width (d), the roll moment of inertia ($I_{xx}$), the pitch moment of inertia ($I_{yy}$) and the sprung mass (M).

9. The device of claim 8, wherein the thirteenth, fourteenth, fifteenth and sixteenth coefficients ($T_{41}$, $T_{42}$, $T_{43}$, $T_{44}$) are defined as:

$T_{41}=m_4*[-(a*b/I_{yy})+1/M-d^2/I_{xx}];$ $T_{42}=m_4*[-(a*b/I_{yy})+1/M+d^2/I_{xx}];$ $T_{43}=m_4*(b^2/I_{yy}+1/M-d^2/I_{xx});$ and $T_{44}=1+m_4*(b^2/I_{yy}+1/M+d^2/I_{xx}).$ 10. A method for determining a tire normal force ($F_z$) in a device having a plurality of tires, a controller and a suspension system with at least one suspension sensor, the method comprising:
  obtaining suspension data (S) via the at least one suspension sensor;
  obtaining a transformation matrix (T) based on a plurality of predefined parameters, via the controller;
  determining the respective tire normal forces ($F_{zi}(t)$, i= 1 ... 4) for one or more of the plurality of tires based on the transformation matrix (T) and the suspension data (S), via the controller, the respective tire normal forces being operative to adjust operation of the device;
wherein the plurality of predefined parameters includes:
a first distance (a) from a front axle of the device to a center of gravity of the device;
a second distance (b) from a rear axle of the device to the center of gravity of the device;
wherein the plurality of tires includes two laterally-spaced tires, such that the two laterally-spaced tires are both on one of the front axle and the rear axle;
a track width (d) between respective first and second centerlines of the two laterally-spaced tires;
a roll moment of inertia ($I_{xx}$) of the device;
a pitch moment of inertia ($I_{yy}$) of the device;
a sprung mass (M) of the device; and
respective masses ($m_i$) of each of the plurality of tires,
wherein the first tire has a first mass ($m_1$); and
wherein the transformation matrix (T) includes a first row having first, second, third and fourth coefficients ($T_{11}$, $T_{12}$, $T_{13}$, $T_{14}$) based at least partially on the first mass ($m_1$), the first distance (a), the second distance (b), the track width (d), the roll moment of inertia ($I_{xx}$), the pitch moment of inertia ($I_{yy}$) and the sprung mass (M).

11. The method of claim 10, wherein obtaining the transformation matrix (T) includes obtaining respective Laplace transforms of sprung- and unsprung mass dynamic equations.

12. The method of claim 10, wherein:
the second tire has a second mass ($m_2$); and
the transformation matrix (T) includes a second row having fifth, sixth, seventh and eighth coefficients ($T_{21}$, $T_{22}$, $T_{23}$, $T_{24}$) based at least partially on the second mass ($m_2$), the first distance (a), the second distance (b), the track width (d), the roll moment of inertia ($I_{xx}$), the pitch moment of inertia ($I_{yy}$) and the sprung mass (M).

13. The method of claim 10, wherein:
the plurality of tires includes a third tire having a third mass ($m_3$);
the transformation matrix (T) includes a third row having ninth, tenth, eleventh and twelfth coefficients ($T_{31}$, $T_{32}$, $T_{33}$, $T_{34}$) based at least partially on the third mass ($m_3$), the first distance (a), the second distance (b), the track width (d), the roll moment of inertia ($I_{xx}$), the pitch moment of inertia ($I_{yy}$) and the sprung mass (M).

14. The method of claim 10, wherein:
the plurality of tires includes a fourth tire having a fourth mass ($m_4$); and
the transformation matrix (T) includes a fourth row having thirteenth, fourteenth, fifteenth and sixteenth coefficients ($T_{41}$, $T_{42}$, $T_{43}$, $T_{44}$) based at least partially on the fourth mass ($m_4$), the first distance (a), the second distance (b), the track width (d), the roll moment of inertia ($I_{xx}$), the pitch moment of inertia ($I_{yy}$) and the sprung mass (M).

15. A device comprising:
a plurality of tires;
a suspension system operatively connected to the plurality of tires;
at least one suspension sensor operatively connected to the suspension system and configured to provide suspension data (S);
a controller operatively connected to the at least one suspension sensor and having a processor and tangible, non-transitory memory on which is recorded instructions for executing a method for determining respective tire normal forces ($F_{zi}(t)$, i=1 . . . 4) for one or more of the plurality of tires, based at least partially on the suspension data (S), the respective tire normal forces being operative to adjust operation of the wheeled device;
wherein execution of the instructions by the processor causes the controller to determine a transformation matrix (T) based on a plurality of predefined parameters;
wherein the plurality of predefined parameters includes a first distance (a) from a front axle of the device to a center of gravity of the device and a second distance (b) from a rear axle of the device to the center of gravity of the device;
wherein the transformation matrix (T) includes a plurality of rows each having a respective plurality of coefficients, the respective plurality of coefficients being based at least partially on the first distance (a) and the second distance (b);
wherein the suspension data (S) includes respective real-time suspension forces ($S_i(t)$, i=1 . . . n) for each of the plurality of tires; and
wherein the controller is configured to obtain the respective tire normal forces ($F_{zi}(t)$, i=1 . . . n) by multiplying the suspension data (S) with the transformation matrix (T) such that:

$$\begin{bmatrix} F_{z1} \\ F_{z2} \\ F_{z3} \\ F_{zn} \end{bmatrix} = T \begin{bmatrix} S_1 \\ S_2 \\ S_3 \\ S_n \end{bmatrix}.$$

16. The device of claim 15, wherein:
the plurality of rows includes a first row, second row, a third row and a fourth row;
the plurality of tires includes a first tire, second tire, a third tire and a fourth tire;
the respective plurality of coefficients of the first row are based at least partially on a first mass of the first tire;
the respective plurality of coefficients of the second row are based at least partially on a second mass of the second tire;
the respective plurality of coefficients of the third row are based at least partially on a third mass of the third tire; and
the respective plurality of coefficients of the fourth row are based at least partially on a fourth mass of the fourth tire.

17. The device of claim 15, wherein:
the plurality of tires includes two laterally-spaced tires, such that the two laterally-spaced tires are both on one of the front axle and the rear axle;
the plurality of predefined parameters further includes a track width (d) between respective first and second centerlines of the two laterally-spaced tires, a roll moment of inertia ($I_{xx}$) of the device, a pitch moment of inertia ($I_{yy}$) of the device and a sprung mass (M) of the device; and
the respective plurality of coefficients of the transformation matrix (T) are based at least partially on the track width (d), the roll moment of inertia ($I_{xx}$), the pitch moment of inertia ($I_{yy}$) and the sprung mass (M).

* * * * *